Figure 1:
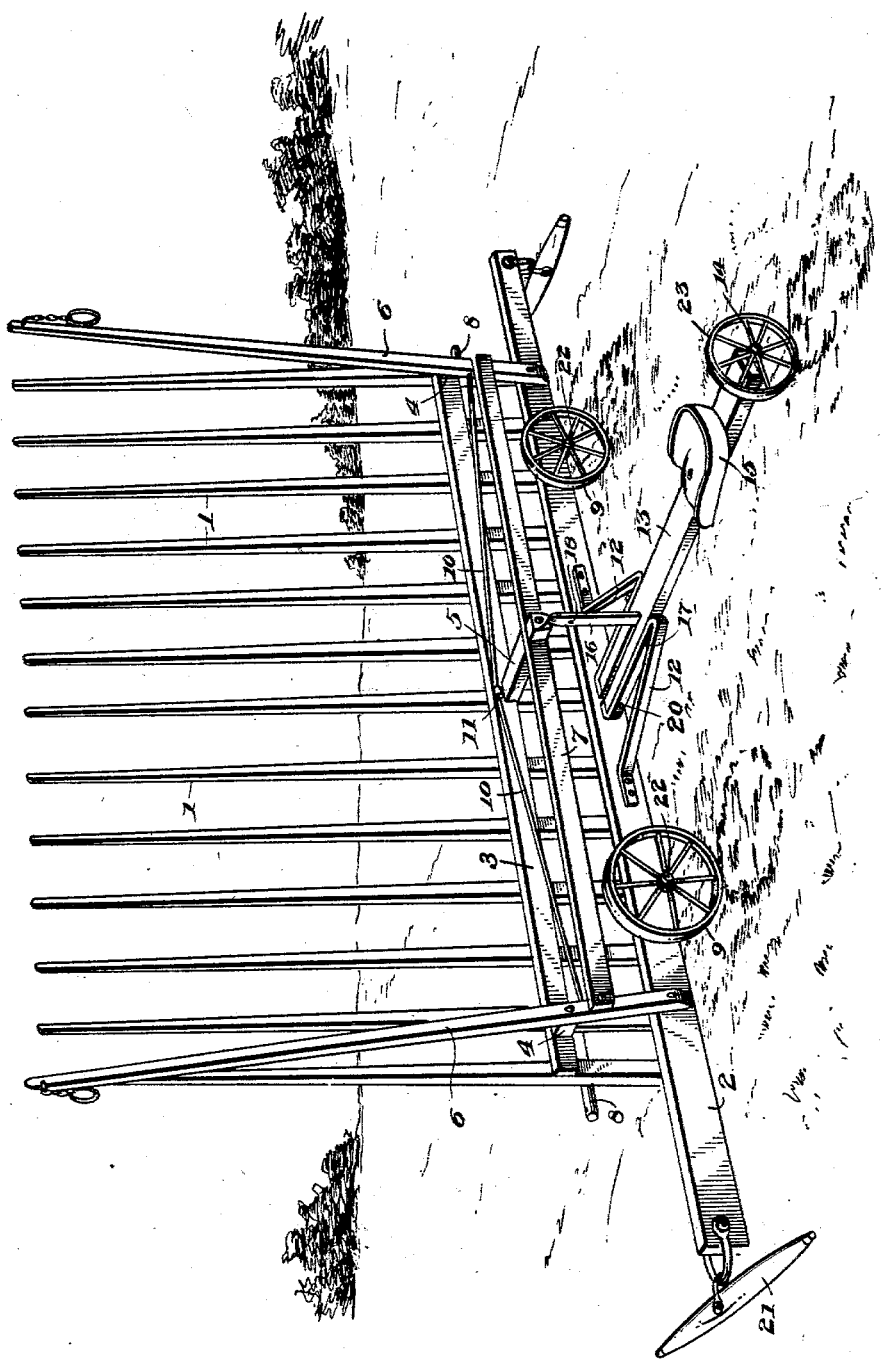

No. 694,831. Patented Mar. 4, 1902.
W. A. CAVETT.
HORSE HAY RAKE.
(Application filed Mar. 25, 1901.)
(No Model.) 2 Sheets—Sheet 1.

No. 694,831. Patented Mar. 4, 1902.
W. A. CAVETT.
HORSE HAY RAKE.
(Application filed Mar. 25, 1901.)
(No Model.) 2 Sheets—Sheet 2.
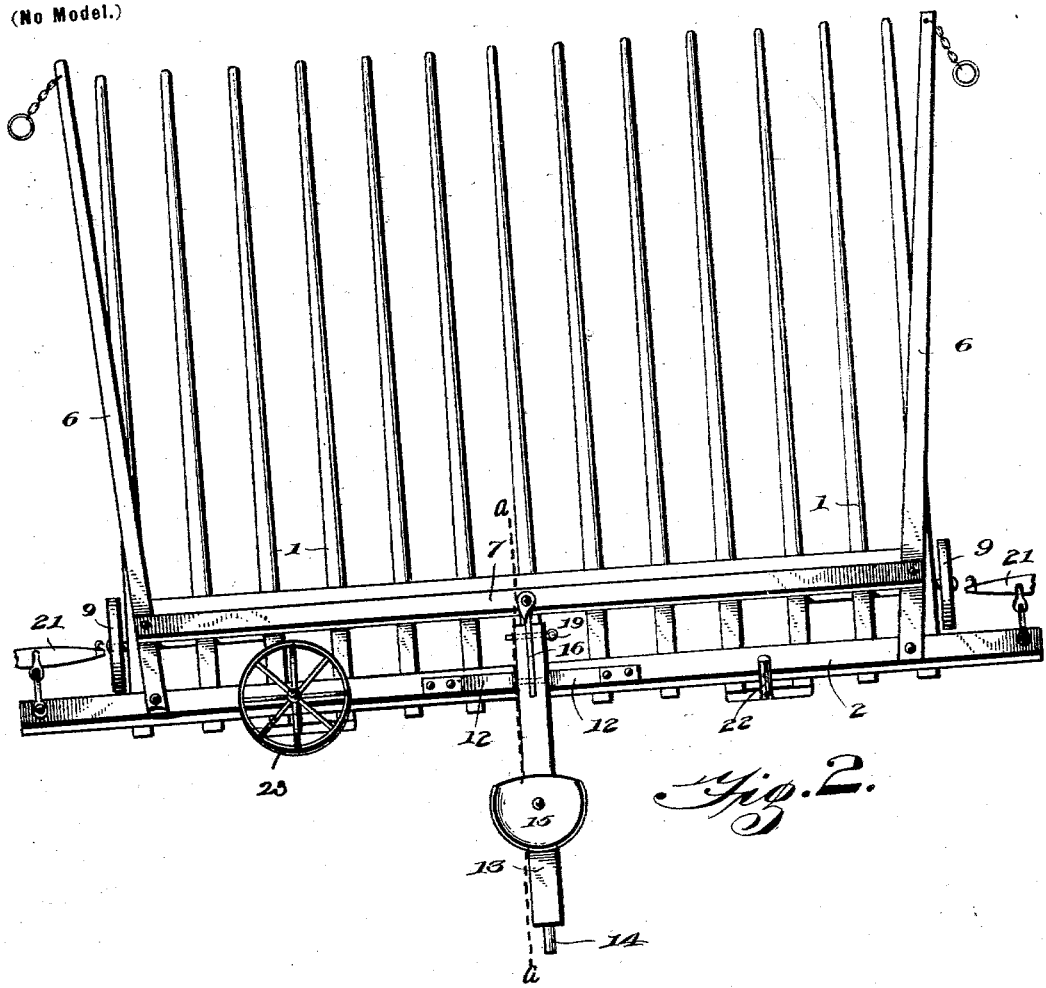
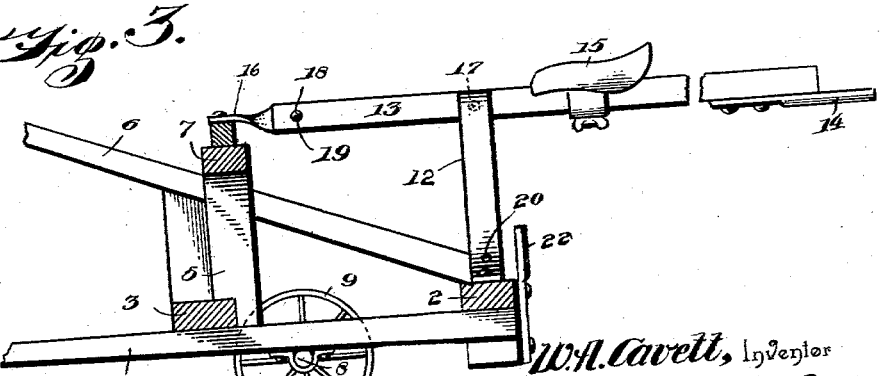

UNITED STATES PATENT OFFICE.

WILLIAM A. CAVETT, OF LAPLATA, MISSOURI.

HORSE HAY-RAKE.

SPECIFICATION forming part of Letters Patent No. 694,831, dated March 4, 1902.

Application filed March 25, 1901. Serial No. 52,843. (No model.)

*To all whom it may concern:*

Be it known that I, WILLIAM A. CAVETT, a citizen of the United States, residing at Laplata, in the county of Macon and State of Missouri, have invented a new and useful Horse Hay-Rake, of which the following is a specification.

My invention is an improved horse hay-rake; and it consists in the peculiar construction and combination of devices hereinafter fully set forth and claimed.

In the accompanying drawings, Figure 1 is a perspective view of a horse hay-rake constructed in accordance with my invention, showing the same in position to be moved from place to place when not in operation. Fig. 2 is a top plan view of the same, showing the rake in operative position. Fig. 3 is a transverse sectional view of the same, taken on a plane indicated by the line *a a* of Fig. 2.

The rake-teeth 1 have their rear ends secured under the pull-beam 2, the ends of which project beyond the outer sides of the outer rake-teeth, as shown. On the rake-teeth, at a suitable distance in advance of the pull-beam, is secured a cross-bar 3. Blocks or standards 4 are disposed on the upper side of the cross-bar 3, near the ends thereof, and a standard 5 rises from the central rake-tooth and is secured to the rear side of cross-bar 3. Obliquely-disposed forwardly-diverging tongues 6 have their rear ends secured on the pull-beam 2, and the said tongues are secured on the upper sides of the blocks 4. A cross-bar 7 has its ends secured on the upper sides of the tongues and its central portion secured on the upper end of the standard 5. Axles 8 are secured under the rake-teeth at the sides of the rake, and the spindles thereof are adapted for the wheels 9, the latter being detachable from said axle. A brace-rod 10 has its ends secured to the tongue 6 and its central portion secured on the center of cross-bar 3, as at 11.

Suitable brackets or standards 12 are secured on the central portion of the pull-beam. Between the same is pivoted a bar 13. The said bar has an axle-spindle 14 at its outer end and carries the seat 15. A brace-link 16 has one end secured on the center of cross-bar 7 and the opposite end secured on the bolt 17, which is the pivot of bar 13. The latter and the said brace-link are provided with openings 18, which register when the bar 13 is in the position shown in Figs. 2 and 3, and a lock-pin 19 may be inserted in said registering openings to secure the bar in this position. When the bar 13 is disposed at right angles to the rake-teeth, its opening 18 registers with openings 20 in the bracket-standards 12, and the pin 19 being inserted in said registering openings said bar may be also locked in this position.

The usual singletrees 21 are attached to the ends of the pull-beam.

The pull-beam is provided at suitable points with spindles 22, which are disposed at right angles to the planes of the rake-teeth and are adapted for the wheels 9 when the latter have been detached from the axles 8. A wheel 23 is adapted to operate on the axle-spindle 14 and to be shifted therefrom to one of the axle-spindles 22.

When the beam 13 is disposed substantially parallel with the rake-teeth and the wheels 9 are on the axles 8, the rake is in operative position, as is shown in Figs. 2 and 3, and is used in the ordinary manner. When it is desired to move the rake from one point to another, and especially when it is necessary to draw the same over narrow roadways, across narrow bridges, and the like, the wheels 9 are taken off the axles 8 and are placed on the spindles 22, and the bar 13 is secured in a position at right angles to the plane of the pull-beam 2, the rake being hence turned so that its teeth are in a vertical position, as shown in Fig. 1, the wheels 9 serving to support the rake and the wheel 14 serving to support the outer end of the bar 13.

Having thus described my invention, I claim—

1. A horse hay-rake having spindles on its side and similar spindles at right angles thereto, supporting-wheels for said spindles, a bracket projecting from and disposed at an angle to said rake, a bar pivotally connected at a point between its ends to the said bracket, and thereby adapted to be extended rearwardly from the rake or turned at right angles thereto at will, said bar having a spindle for a supporting-wheel at its outer end, and means to secure said bar in either of said positions, substantially as described.

2. A horse hay-rake having spindles on its side and similar spindles at right angles thereto, supporting-wheels for said spindles, a bracket projecting from and disposed at an angle to said rake, a bar pivotally connected at a point between its ends to the said bracket, and thereby adapted to be extended rearwardly from the rake or turned at right angles thereto at will, and means to secure said bar in either of said positions, substantially as described.

3. A horse hay-rake having a series of rake-teeth, and a pull-bar at the rear ends thereof, said rake having spindles for supporting-wheels at its side and similar spindles at right angles thereto and projecting from said pull-bar, a bracket projecting from and disposed at an angle to said rake, a support in advance of said bracket, a bar pivoted at a point between its ends to said bracket and having a spindle for a supporting-wheel at its outer end, said bar being thereby adapted to be extended rearwardly from said rake or turned at right angles thereto at will and means to secure the inner end of said bar either to said bracket or said support, substantially as described.

In testimony that I claim the foregoing as my own I have hereto affixed my signature in the presence of two witnesses.

WILLIAM A. CAVETT.

Witnesses:
JOSEPH S. MATTER,
TYLER PAINE.